United States Patent [19]

Kresge et al.

[11] Patent Number: 4,666,619
[45] Date of Patent: May 19, 1987

[54] ETHYLENE POLYMER USEFUL AS A LUBRICATING OIL VISCOSITY MODIFIER E-25

[75] Inventors: Edward N. Kresge, Watchung; Gary W. Ver Strate, Matawan, both of N.J.

[73] Assignee: Exxon Research & Engineering Co., Florham Park, N.J.

[21] Appl. No.: 785,726

[22] Filed: Oct. 9, 1985

Related U.S. Application Data

[62] Division of Ser. No. 682,286, Dec. 17, 1984, Pat. No. 4,575,574.

[51] Int. Cl.$^4$ ............................................ C10M 101/08
[52] U.S. Cl. .................................. 252/56 S; 585/520; 585/522; 585/12
[58] Field of Search .............. 252/56 S; 585/520, 522, 585/12

[56] References Cited

U.S. PATENT DOCUMENTS

| | | | |
|---|---|---|---|
| 3,790,480 | 2/1974 | Campbell et al. | 585/12 |
| 3,894,999 | 7/1975 | Boozer et al. | 585/522 |
| 4,197,420 | 4/1980 | Ferraris et al. | 585/522 |
| 4,469,910 | 9/1984 | Loveless | 585/522 |

*Primary Examiner*—William R. Dixon, Jr.
*Assistant Examiner*—Cynthia A. Prezlock
*Attorney, Agent, or Firm*—S. H. Markowitz; J. B. Murray, Jr.

[57] ABSTRACT

An ethylene ter- or tetrapolymer useful as a viscosity modifer and a process for preparing the polymer. The polymer comprises ethylene, an alpha-olefin, a non-conjugated diene and, optionally, a cationically polymerizable monoolefin. The polymerization catalyst comprises a Ziegler catalyst in conjunction with a cationic polymerization catalyst.

21 Claims, No Drawings

ETHYLENE POLYMER USEFUL AS A LUBRICATING OIL VISCOSITY MODIFIER E-25

This is a division of application Ser. No. 682,286, filed 12/17/84, now U.S. Pat. No. 4,575,574.

BACKGROUND OF THE INVENTION

It is well known that refined petroleum oils generally exhibit substantial changes in viscosity with temperature. The viscosity index ("V.I.") is a measure of the slope of the temperature-viscosity curve. It is preferred that a lubricating oil, e.g., automobile lubricating oil, exhibit a "flat" V.I. curve. The desired V.I. characteristic is generally achieved by adding oil soluble polymers to oil. For many years the preferred polymer additive was polyisobutylene.

Recently, specialty ethylene-propylene copolymers have been developed and are now widely used as V.I. improvers. Since lubricating oils are used in a wide range of applications, the market requires a variety of grades of such polymers having differing degrees of "thickening effect" so as to permit the formulation of lubricating oils having different viscosities and "Shear stability indicies". Such polymer grades may be prepared by direct synthesis, the molecular weight grades being determined by the polymerization process, or the different molecular weight grades can be produced by degradation of an ethylene-propylene copolymer so as to produce lower molecular weight fractions.

The patent literature is replete with many publications dealing with ethylene ter-and tetrapolymers containing one or more types of dienes introduced for a variety of reasons including a means for introducing unsaturation, thereby providing a means for crosslinking the polymer.

In the case of viscosity index improvers, crosslinking is neither a necessary nor desirable characteristic of the polymer. Illustrative of patents dealing with unsaturated ethylene ter-and tetrapolymers is U.S. Pat. No. 3,790,480. Polymers of ethylene, $C_3$–$C_{18}$ higher alpha olefins and two classes of dienes are taught, the dienes having double bonds of the same or different polymerizability. In one class of dienes represented by 1,4-hexadiene, only one of the double bonds is readily polymerizable by the catalyst used. In another class of which 2,5-norbornadiene is representative, both double bonds are polymerizable utilizing the polymerization process of the patent. It is taught that the preferred viscosity indexes improvers are ethylene tetrapolymers wherein both classes of double bonds are used.

Presumably, superior properties are achieved because use of a diene with two active double bonds results in long chain branching with a concomitant increase in bulk viscosity of the polymer without any significant increase in intrinsic viscosity or thickening efficiency. Increased bulk viscosity facilitates the manufacture and storage of the polymer. The catalyst used for polymerization is a Ziegler type catalyst. Both double bonds of the 2,5-norbornadiene are polymerizable by the Ziegler catalyst. The other diene, 1-4 hexadiene, however, has only one Zeigler catalyst polymerizable double bond. Hence, the polymers include a minor amount of unsaturation.

Unsaturation in a polymeric viscosity index improving oil additive is generally undesirable since the unsaturated moiety introduces a site through which chemical reactions can occur under the conditions of use of the lubricating oil. Such reactions are undesirable since they cause changes in the viscosity of the lubricating oil. On the other hand, branched saturated ethylene tri or tetra polymers have desirable properties as viscosity modifiers.

SUMMARY OF THE INVENTION

It has surprisingly been found that substantially saturated, long chain, branched ter-and tetrapolymers of ethylene can be prepared using a non-conjugated diene polymer by selecting as the polymerization initiator a catalyst system which is both a coordination catalyst and a cationic polymerization catalyst. The preferred coordination catalysts are Ziegler catalysts known to be useful in the preparation of ethylene-propylene-non-conjugated diene terpolymers. The cationic polymerization catalysts are either conventional cationic polymerization catalysts or are catalyst species which, in conjunction with the coordination catalyst, initiate cationic polymerization.

The preferred monomers are ethylene propylene and 5-ethylidene-2-norbornene. The preferred catalyst system is $VCl_4$ or $VOCl_3$, in combination with $Al_2Cl_3Et_3$.

DETAILED DESCRIPTION

This invention relates to a polymer comprising the reaction product of ethylene, an alpha-olefin and a non-conjugated diene which has utility as a viscosity modifier. More particularly it relates to saturated ter-and tetra polymers of ethylene, an alpha olefin and at least one non-conjugated diene wherein the diene has a first double bond polymerizable in the presence of a coordination catalyst and a second double bond which is cationically polymerizable Not wishing to be bound by theory, it is believed that a polymer of the ethylene, alpha-olefin and non-conjugated diene is formed wherein the coordination catalyst polymerizable diene is incorporated into the backbone with subsequent coupling of these chains involving the cationically polymerizable double bond. This coupling produces a long chain branch in the polymer molecule. Of course, it is probable that some degree of simultaneous reaction of both double bonds occurs. However, since only small quantities of non-conjugated diene is used, as compared to ethylene and other alpha olefins, the mass effect mitigates in favor of its incorporation into the backbone first. In any event, the resultant polymer is a predominately saturated, long chain, branched oil soluble polymer of high bulk viscosity and low intrinsic viscosity.

The alpha-olefins suitable for use in the practice of this invention are linear and branched $C_3$–$C_{18}$ alpha-olefins. The preferred alpha-olefins are $C_3$–$C_8$ linear alpha-olefins. The most preferred alpha-olefin is propylene.

Illustrative non-limiting examples of such alpha-olefins are propylene, butene, pentene, hexene, heptene, octene, nonene, decene, dodecene, 2-methyl butene-3, 2-methyl pentene-4, 2-methyl hexene-5, 2-ethyl hexene-5 etc.

The dienes suitable for use in the practice of this invention are non-conjugated dienes having one double bond which is coordination catalyst polymerizable and one double bond which is cationically polymerizable. Illustrative non-limiting examples of such non-conjugated dienes are 2-methyl hexadiene-1,5; 2-methyl heptadiene-1,6; 5-methylene-2-norbornene, 5-ethylidene-2-norbornene, 2-methyl norbornadiene, 5-isopropenyl-2-norbornene, 5-methallyl-2-norbornene, 5(2'-methyl-1- propene)-2-norbornene, 5-methyl vinyl-2-norbornene, 3-methallyl cyclopentene, and 3(2'-methyl-1-propenyl)-cyclopentene and dicyclopentadiene.

A fourth monomer which is a cationically polymerizable monoolefin such as isobutene may be included in the polymerization medium. All of the monomers must be hydrocarbons.

The polymerization is advantageously carried out in solution. Suitable solvents for the polymerization reaction are hydrocarbon or chlorinated hydrocarbon solvents which are solvents for both the polymer and monomer. Illustrative examples of such solvents are hexane, methyl cyclohexane, cyclohexane, pentane, isopentane, heptane, tetrachloroethylene, toluene, benzene, and so forth.

The catalyst system of this invention comprise (1) a coordination catalyst and (2) a catalyst which is a cationic polymerization initiator or (3) a compound which in conjunction with (1) or (2) generates a cationic catalyst. Illustrative examples of the coordination catalyst of this invention are those catalysts known generally as Ziegler catalysts. These Zeigler catalyst comprise, for example, $VCl_4$, $VOCl_3$, or $VO(OR)_3$ wherein R is a hydrocarbon of 1 to 8 carbon atoms, e.g., trialkoxyvanadate, in conjunction with a cocatalyst wherein the cocatalyst is an aluminum alkyl i.e., $AlR_3$ wherein R is as previously defined, or an alkyl aluminum halide in which the number of alkyl groups is equal to or greater than the number of halogens, i.e., $R_mAl_nX_p$ wherein X is halogen, R is as previously defined, n is an integer, $m+p=3n$ and $m \geq p$, e.g., $Et_3Al_2Cl_3$ or $Et_2AlCl$.

The terms "cationic initiator" as used in the specification and claims means a catalyst which at least to some degree, initiates cationic polymerization. It may be necessary to improve the catalyst efficiency by using a cationic promoter with the cationic initiator. Suitable cationic initiators are HCl, $AlCl_3$ or an alkyl aluminum halide in which the number of halogens is greater than the number of alkyl groups, i.e., $R_rAl_sX_t$, wherein R and X are as previously defined and r, s, and t are integers of positive values and $r=3s-t$, for example, $EtAlCl_2$. The cationic initiator is optionally utilized in conjunction with a cationic promoter which is for example a tertiary alkyl halide, a benzyl chloride or a benzyl bromide. Illustrative examples of the tertiary alkyl halide are tertiary butyl chloride, 2-ethyl-2-chloro propane, 2-methyl-2-chlorohexane, and so forth.

As described herein the catalyst system of this invention comprises a coordination catalyst in conjunction with a catalyst which initiates cationic polymerization which comprises either a cationic initiator or a cationic initiator plus a promoter. While it will be readily recognized that the cationic promoters of this invention, alone, are never cationic polymerization catalysts by themselves when used in conjunction with particular cocatalysts of the Ziegler catalyst they can initiate cationic polymerization.

As used in the specification and claims, the term "cationic polymerization catalyst" means (1) a catalyst which of itself initiates cationic polymerization, e.g., cationic initiator (2) a cationic initiator which in conjunction with a cationic promoter exhibits improved catalytic activity, and initiates cationic polymerization or (3) a cationic promoter which in conjunction with the cocatalyst of a Ziegler catalyst initiates cationic polymerization.

Where the cationic initiator is $AlCl_3$ or $RAlX_2$ where X is chlorine or bromine, a cationic promoter is not required, but may be used to improve cationic activity. Where the cocatalyst of the Ziegler catalyst is an alkyl aluminum halide, as defined, e.g. $Et_3Al_2Cl_3$, the cationic promoter alone in conjunction with the appropriate Ziegler catalyst is a suitable catalyst system to initiate both polymerization reactions.

In the Ziegler catalyst the ratio of co-catalyst to catalyst is defined in terms of the mole ratio Al/M wherein M is V or Ti. Al/M is about 2 to about 25, preferably about 3 to about 15, more preferably about 4 to about 7, e.g., 5.

The molar ratio of cationic initiator to Ziegler catalyst is about 0.1 to about 20, preferably about 0.5 to about 15, more preferably about 1 to about 10, most preferably about 2 to about 8, e.g., 3.

The amount of cationic promoter is based on the amount of cocatalyst or cationic initiator used and hence, is defined by the ratio P/Al wherein P represents the cationic promoter P/Al can be about 0.1 to about 10, preferably about 0.3 to about 5, more preferably about 0.5 to about 2, e.g. 1.

Table I presents non-limiting, illustrative examples of the catalyst system of this invention.

TABLE I

| Ziegler Catalyst | | | Cationic | Initiator* | Catalyst | |
|---|---|---|---|---|---|---|
| Catalyst | Co-Catalyst | Al/M | Initiator | I/M | Promoter | P/Al |
| $VCl_4$ | $Et_3Al_2Cl_3$ | 5 | HCl | 3 | — | — |
| " | $AlEt_3$ | 5 | HCl | 4 | — | — |
| " | $Et_3Al_2Cl_3$ | 5 | — | — | t-butyl chloride | 5 |
| $VOCl_3$ | $Et_2AlCl$ | 5 | HCl | 4 | | |
| " | $Al_2Et_3Cl_3$ | 5 | HCl | — | — | — |
| " | $Al_2Et_3Cl_3$ | 8 | $EtAlCl_2$ | — | benzyl chloride | 2 |
| " | $Et_2AlCl$ | | HCl | 6 | — | — |
| " | $Et_2AlCl$ | | $EtAlCl_2$ | — | t-butyl chloride | 2 |
| " | $Al_2Et_3Cl_3$ | 5 | $EtAlCl_2$ | 3 | t-butyl chloride | 1 |
| " | $Al_2Cl_3Et_3$ | 5 | $EtAlCl_2$ | — | — | — |

*Ratio of cationic initiator to M.

As used in the specification and claims the term "Thickening Efficiency" (T.E.) means the ratio of the weight percent of a polyisobutylene having a Staudiger molecular weight of 20,000, required to thicken a solvent extracted neutral mineral lubricating oil, having a viscosity of 150 SUS at 37.8° C., a viscosity index of 105 and an ASTM pour point of 0° F., to a viscosity of 12.4 centistokes at 98.9° C., to the weight percent of a test copolymer required to thicken the same oil to 12.4 centistokes at 98.9° C.

Mooney Viscosity measures were performed in accordance with ASTM D-1646 (ML 1+8 (100° C.)).

The term "shear stability index" (SSI) as used in the specification and claims means the percent reduction of the polymer viscosity after it is subjected to sonic breakdown. The viscosity of the polymer is determined before and after exposure to sonic breakdown and the SSI is recorded as the percent reduction in viscosity.

The advantages of the instant invention may be more readily appreciated by reference to the following examples:

EXAMPLE I

A solution polymerization is carried out in a continuous flow stirred reactor in the manner shown in Table II, Run A. The polymer formed had a sufficiently low molecular weight, and thus thickening efficiency, so that it had a shear stability index ("SSI") of 18% as compared to 30% for conventional ethylene propylene copolymers having a thickening efficiency ("T.E.") of about 2.8. The bulk viscosity of the polymer was measured at a stress of about $10^4$ dynes/cm$^2$. Measurements were performed at 100° C. using procedures as described in W. Graessley, G. Ver Strate, *Rubber Chem & Tech*, 53 842 (1980) incorporated herein by reference. A strip of polymer (1×10×1.2 cm) is clamped at one end and allowed to extend under gravitational stress. The extension rate (dl/dt) is calculated as a function of the density and Newtonian viscosity, and it is assumed that Troucons Rule, $3\eta$ shear $= \eta$ elongation applies. The bulk viscosity of the polymer was found to be a typical value for an ethylene-propylene-5-ethylidene-2-norbornene terpolymer of the same molecular weight, i.e. $4 \times 10^5$ poise Table III. This bulk viscosity is too low to permit satisfactory processing in a commercial elastomer plant. Such polymers exhibit such severe cold flow problems that the polymer rapidly agglomerates as a single solid mass and is not readily removed from the recovery vessels.

TABLE II

| Process Variable | Run # A | B | C |
|---|---|---|---|
| Residence Time min | 17 | 15 | 13 |
| Temperature °C. | 27 | 27 | 27 |
| Pressure Kpa | 413 | 413 | 413 |
| Total hexane feed kg/h | 7.5 | 24.2 | 31.6 |
| ethene kg/100 kg hexane | 3.4 | 3.86 | 2.5 |
| propene kg/100 kg hexane | 11.0 | 12.0 | 6.8 |
| ethylidene norbornene kg/100 kg hexane | 0.65 | 0.74 | .0156 |
| VOCl$_3$ catalyst m mole/hr | 2.07 | 13.4 | 15.3 |
| Al$_2$Et$_3$Cl$_3$ cocatalyst m mole/hr | 12.4 | 80.6 | 92.1 |
| transfer agent ppm on ethylene | 400 | 200 | 125 |
| Cationic Agents | | | |
| EtAlCl$_2$ m mole/hr | — | — | 46 |
| HCl | — | 80.4 | — |

EXAMPLE II

The polymerization reaction of Example I was repeated in substantially the same manner using the conditions set forth in Run B of Table II. Although the polymer found had substantially the same Mooney Viscosity and thickening efficiency as the polymer of Run A, its bulk low strain rate viscosity was higher than the high molecular weight control (Table III).

EXAMPLE III

The polymerization reaction of Example I was repeated using the conditions of Run C (Table II). Again an oil soluble polymer of substantially lower T.E. is produced with improved SSI as compared to the high molecular weight control (see Sample D of Table III below). Yet the bulk viscosity is nearly as high as the high molecular weight control. In this example EtAlCl$_2$ was used as the cationic initiator whereas HCl was used in Example II. If desired a promoter of this invention can be used with the EtAlCl$_2$. An analysis for unsaturation detected 0.2 weight percent ethylidene norbornene. The polymer is substantially saturated.

The polymers of this invention Run B (Example II) and Run C (Example III) are compared to Run A (Example I) a low molecular weight polymer as a control, and a high molecular weight commercially available ethylene-propylene polymer as an additional control.

The results are shown in Table III. The high molecular weight polymer exhibits poor shear stability (SSI=30%). While the low M.W. control (Run A) has a good SSI value (18%), it has a low bulk viscosity ($4 \times 10^5$ poise). As a result it can not be readily handled because of severe agglomeration problems. The polymer of Run B is substantially identical to the branched control polymer (Run A) except that its bulk viscosity is $1.3 \times 10^6$, and therefore, can be readily handled. It forms a crumb which remains as discrete particles for a time sufficient to empty the recovery vessel and complete polymer finishing and packaging. While the polymer of Run C has a slightly higher SSI (23%) it is still acceptable.

The shear stability index (SSI) is determined by measuring the initial viscosity of the polymer subjecting it to sonic shear and then again measuring the viscosity. The percent change in viscosity, expressed as a percent value, is the SSI.

The thickening efficiency (T.E.) of the polymers of Runs A, B and C are all within acceptable limits. The polymers were tested for T.E. measurements by dissolving them in a solvent extracted neutral mineral lubricating oil having a viscosity of 150-SUS at 37.8° C.

TABLE III

| Polymer | | wt. % ethylene | Mooney 100° C. | $[\eta]$* | $\eta_o$ poise | SSI (%) | T.E. |
|---|---|---|---|---|---|---|---|
| A | low molecular weight control | 44 | 15 | 1.4 | $4 \times 10^5$ | 18 | 1.8 |
| C | — | 43 | 20 | 1.6 | $1.3 \times 10^6$ | 23 | 2.2 |
| B | — | 45 | 23 | 1.4 | $4.0 \times 10^6$ | 18.5 | 1.9 |
| D | high molecular weight control | 44 | 45 | 2.0 | $2 \times 10^6$ | 30 | 2.8 |

*intrinsic viscosity in decalin at 135° C.

EXAMPLE IV

The experiment of Example II is rerun in the same manner except that isobutene is fed to the reactor at the same rate as 5-ethylidene-2-norbornene. The polymer has a bulk viscosity in excess of $10^7$ poise at a strain rate of ca $10^{-3}$ sec at 100° C. There is less than $1.5 \times 10^{-3}$ moles unsaturation/100 g polymer.

It is not intended that the scope of this invention be limited by the method of manufacture. While the Examples refer to a continuous flow stirred reactor, any method of polymerization suitable for ethylene copolymer polymerization may be used. For example, a tubular reactor of the type utilized in the manufacture of polyethylene may be used.

In carrying out the polymerization of this invention in a tubular reactor, all of the catalyst system need not be introduced simultaneously. The Ziegler catalyst can be introduced at the reactor inlet and the cationic initiator can be introduced downstream after polymerization has commenced.

As used in the specification and claims, the term "substantially saturated" means that the polymer has less than $5.0 \times 10^{-3}$ moles of olefinic unsaturation/100 g. polymer. Preferably the unsaturation level is less than $10^{-3}$ moles/100 g of polymer.

The polymer prepared by the method of this invention are oil soluble polymers which are useful as viscosity modifiers. They may be used with any class of lubricating fluids in which they are soluble, either alone, or in conjunction with other oil additives. The term "lubricating fluid" as used in the specification and claims means naphthenic, aromatic or paraffinic petroleum oil fractions which are generally suitable for use as lubricating fluids as well as synthetic lubricating oils such as polyesters, polyalphaolefins of $C_5$–$C_{20}$ alphaolefins and $C_{10}$ trimers. The polymer of this invention are generally utilized in the lubricating fluid at about 0.5% to about 5% by weight of the overall composition, preferably about 0.8 to about 1.5% by weight.

The polymers of this invention have a bulk viscosity which is at least 3 times that of a linear ethylene-propylene polymer of the same intrinsic viscosity and ethylene content.

What is claimed is:

1. A lubricating oil composition comprising a lubricating fluid and an amount, effective for improving viscosity, of a thickening agent which comprises a substantially saturated, long chain, branched ethylene tetrapolymer comprising ethylene, an alpha-olefin, a non-conjugated diene monomer having a first site of unsaturation which is coordination catalyst polymerizable and a second site of unsaturation which is cationically polymerizable, and a cationically polymerizable mono-olefin; said monomer having a bulk viscosity at 100° C. and strain rate less than $10^{-3}$ sec$^{-1}$ which is at least 3 times that of a linear ethylene-propylene polymer having the same intrinsic viscosity and ethylene content.

2. The composition according to claim 1 wherein the cationically polymerizable mono-olefin is isobutene.

3. The composition according to claim 2 wherein the alpha-olefin is propylene and the non-conjugated diene is 5-ethylidene-2-norbornene.

4. The polymer according to claim 3 wherein the isobutene and 5-ethylidene-2-norbornene are incorporated in equal molar quantities.

5. The composition of claim 1 wherein the alpha-olefin is a $C_3$–$C_{18}$ alpha-olefin.

6. The composition of claim 5 wherein the alpha-olefin is a $C_3$–$C_8$ alpha-olefin.

7. The composition of claim 6 wherein the alpha-olefin is propylene.

8. The composition according to claim 1 wherein the non-conjugated diene is 2-methyl hexadiene-1,5; 2-methyl heptadiene-1,6; 5-methylene-2-norbornene; 5-ethylidene-2-norbornene; 5-(2'-methyl-1-propene)-2-norbornene; 5-methyl vinyl-2-norbornene; 3-methallyl cyclopentane; 3(2'-methyl-1-propene)cyclopentene or dicyclopentadiene.

9. The composition according to claim 8 wherein the non-conjugated diene is 5-ethylidene-2-norbornene.

10. The composition according to claim 4 wherein the alpha-olefin is propylene and the non-conjugated diene is 5-ethylidene-2-norbornene.

11. The lubricating oil composition according to claim 4 wherein the polymer is present at about 0.5% to about 3% by weight of the composition.

12. The lubricating oil composition according to claim 11 wherein the polymer is present at about 0.8% to about 2.0% by weight.

13. A lubricating oil composition comprising a lubricating fluid and an amount, effective for improving viscosity, of a thickening agent which comprises a substantially saturated, long chain, branched ethylene terpolymer consisting essentially of ethylene, an alpha-olefin, and a non-conjugated diene monomer having a first site of unsaturation which is coordination catalyst polymerizable and a second site of unsaturation which is cationically polymerizable; said polymer having a bulk viscosity at 100° C. and strain rate less than $10^{-3}$ sec$^{-1}$ which is at least 3 times that of a linear ethylene-propylene polymer having the same intrinsic viscosity and ethylene content.

14. The composition of claim 13 wherein the alpha-olefin is a $C_3$–$C_{18}$ alpha-olefin.

15. The composition of claim 14 wherein the alpha-olefin is is a $C_3$–$C_8$ alpha-olefin.

16. The composition of claim 15 wherein the alpha-olefin is propylene.

17. The composition according to claim 13 wherein the non-conjugated diene is 2-methyl hexadiene-1,5; 2-methyl heptadiene-1,6; 5-methylene-2-norbornene; 5-ethylidene-2norbornene; 5(2'-methyl-1-propene)-2-norbornene; 5-methyl vinyl-2-norbornene; 3-methallyl cyclopentane; 3(2'-methyl-1-propene)cyclopentane or dicyclopentadiene.

18. The composition according to claim 17 wherein the non-conjugated diene is 5-ethylidene-2-norbornene.

19. The composition according to claim 13 wherein the alpha-olefin is propylene and the non-conjugated diene is 5-ethylidene-2-norbornene.

20. The lubricating oil composition according to claim 13 wherein the polymer is present at about 0.5% to about 3% by weight of the composition.

21. The lubricating oil composition according to claim 19 wherein the polymer is present at about 0.8% to about 2.0% by weight.

* * * * *